United States Patent

[11] 3,594,586

[72] Inventor  Rene A. M. Toesca
                Boyertown, Pa.
[21] Appl. No. 828,108
[22] Filed     May 23, 1969
[45] Patented  July 20, 1971
[73] Assignee  Energy Transformation Corporation
                Boyertown, Pa.
[32] Priority  Apr. 16, 1965
[33]           France
[31]           13660
               Continuation of application Ser. No.
               542,531, Apr. 14, 1966.

[54] INSTALLATION FOR FURNISHING CURRENT WITHOUT DISCONTINUITY IN CASE OF POWER FAILURE
11 Claims, 3 Drawing Figs.

[52] U.S. Cl. .................................................. 307/66
[51] Int. Cl. .................................................. H02j 9/00
[50] Field of Search ...................................... 310/25;
                       307/64, 66, 85, 86, 87, 43, 46, 52, 60

[56]                References Cited
               UNITED STATES PATENTS
1,951,482  3/1934  Holden ........................ 307/64
3,011,111  11/1961 Clifford ....................... 310/25 X Primary Examiner—Robert K. Schaefer
Assistant Examiner—J. Hohauser
Attorneys—Nelson E. Kimmelman and Maleson, Kimmelman & Ratner ABSTRACT: This emergency standby power system includes a battery which is constantly charged whenever the normal AC source is functioning. The battery supplies power to an inverter which is coupled to one of the output terminals and which is synchronized by induced voltages applied to the inverter input in response to the vibrations of a vibrating magnetic element. The vibrating element responds to the AC source when it is functioning and to an auxiliary winding connected to the output of the inverter when the AC source is not functioning. When the AC source is not functioning, a turbine-driven DC generator applies current to power the inverter.

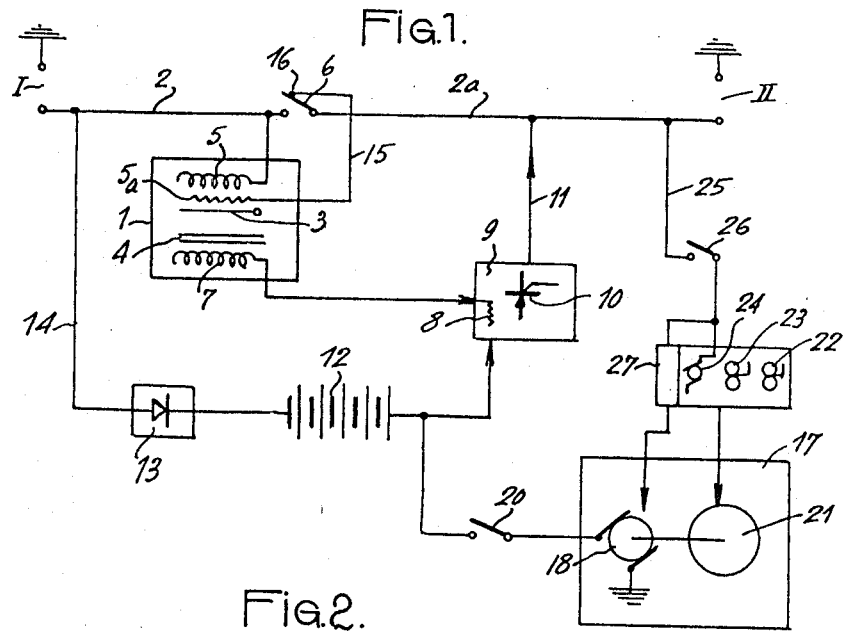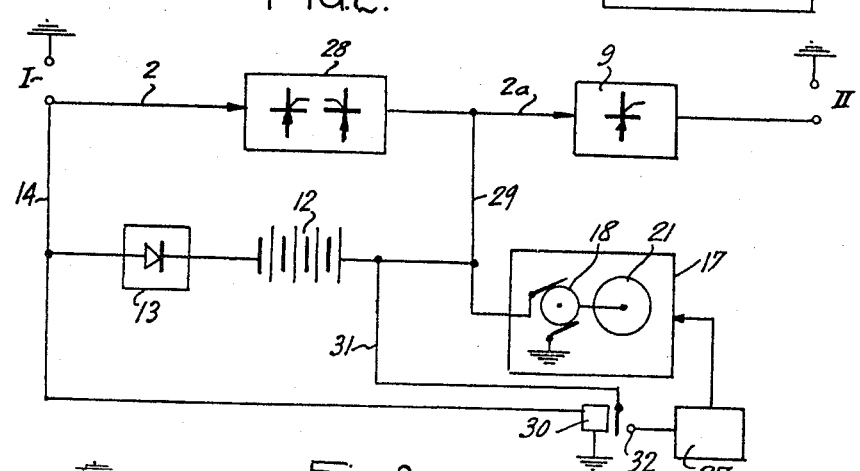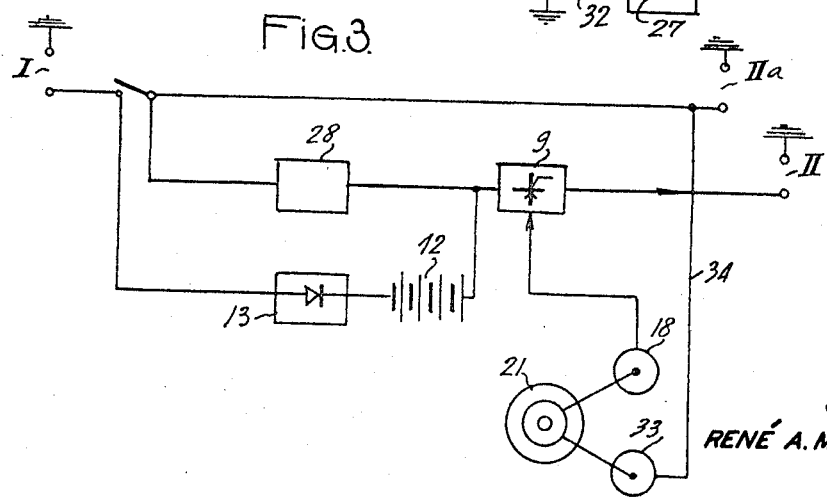

INSTALLATION FOR FURNISHING CURRENT WITHOUT DISCONTINUITY IN CASE OF POWER FAILURE

This is a continuation of application Ser. No. 542,531 filed Apr. 14, 1966, now abandoned.

The present invention relates to a system for mitigating electrical power failures and this system permits supplying load circuits with AC as soon as a failure occurs in the normal supply network without there being substantial modification of the frequency or phase of the original supply current.

In accordance with the invention the overall system includes a standby battery furnishing DC to an inverter assembly synchronized with the nominal frequency of the network and in phase with it. This inverter assembly is mounted in circuit with the voltage supply for the load and is maintained continuously under an applied voltage. An electrical generator set is provided and is subjected to relay means responsive to power failures in a way such that this generator means is put into operation only when there is a failure.

Various other characteristics of the invention will also become apparent from the detailed description which follows.

Embodiments of the subject of the invention are represented, by way of nonlimiting examples, in the sole sheet of drawings herein in which:

FIG. 1 is an electrical schematic diagram, partly condensed, illustrating the first embodiment of the invention.

FIG. 2 is a diagram analogous to FIG. 1 showing a variation thereof.

FIG. 3 is a diagram similar to FIG. 2, showing an added characteristic.

In the embodiment of the invention for supplying AC current for load circuits which must be supplied without interruption and without substantial frequency or phase modification, there is provided according to FIG. 1 a synchronizing reference circuit designated in its entirety by the numeral 1. This synchronizing circuit is connected in parallel with the supply line 2 linking the AC supply network I with the receiving or load circuit II. The synchronizing circuit 1 as it is shown includes a vibrating element 3 which is depicted in the form of a reed made of a magnetic material vibrating in a magnetic circuit 4. This vibrating reed 3 vibrates at its natural frequency chosen to correspond to that of the AC furnished by the network I and is maintained in its oscillating movement, for example, by coil 5. The coil 5 when it is energized keeps closed a switch 6 mounted in the line 2 and as a result the current from the network I in this fashion furnished directly to the load II.

The vibrating movement of the reed 3 is used in order to induce a current of the same frequency in an inductive load coil 7 which maintains the control circuit 8 of an inverter assembly 9 energized. The excitation means 8 are shown in the drawing in the form of a coil but it is evident that it can be made in other ways. Similarly, the inverter assembly 9 is represented as being of the type consisting of silicon-controlled rectifiers 10 but it can also include other means, for example, a turning commutator or gas tubes, notably cold cathode gas tubes.

The inverter assembly 9 is linked with the line 2 by conductor 11 and, preferably, this inverter assembly is arranged to furnish at all times a trickle current of the same frequency and of the same phase as that furnished by the network I.

The supply of power for the inverter assembly 9 is assured by a battery 12 which is itself maintained constantly charged by a charging assembly 13 powered from network I by means of a lead 14. The charging assembly 13 can have a small capacity since it is only utilized in order to maintain the battery 12 appropriately charged thereby to supply the small amount of current necessary for the functioning of the inverter 9 under weak current conditions.

The synchronizing circuit 1 includes a second excitation winding 5a, known as the auxiliary excitation winding, similar to the winding 5 which keeps the reed 5 vibrating. This second winding 5a is coupled by a lead 15 to a contact 16 which is supplied by the portion 2a of the line 2 linking the network I to the load II when a failure in the power of network I occurs and thus, consequently, the winding 5 is no longer supplied thereby making the switch arm 6 assume the position shown in FIG. 1.

The method of operation described above demonstrates that there is no interruption of the power to the load 2 since at the time the winding 5 is no longer supplied with power and the reed 3 continues to vibrate at its natural frequency even though the amplitude of its movement may decrease somewhat up to the moment that the winding 5a is again supplied by the portion of the line 2a, that is to say, starting from the inverter assembly 9 which is itself supplied by the battery 12.

So that the battery does not risk being discharged, there is provided a generator set 17 including a DC generator 18 whose output is in line 19 of the charging circuit of the battery 12. Line 19 is preferably equipped with a switch 20 which is also controlled by the winding 5 of the synchronizing circuit 1 so that the said switch 20 is closed only when a failure occurs in the network I. Generator 18 is shown as being driven by a gas turbine 21 whose auxiliary elements, for example, the fuel pump 22 as well as the oil pump 23, are driven by an electric motor 24 connected to a supply line 25 linked to the portion 2a of the line 2.

The switch 26 is also preferably controlled by the winding 5 so as not to be closed, like switch 20, except when a failure occurs in the network. Line 25, moreover, also energizes a solenoid relay 27 which has the effect of coupling the generator 18 as a motor as soon as the failure occurs in order to trigger the turbine 21, whereupon relay 27 reverses the coupling of the said generator as soon as the turbine goes back into operation.

As the foregoing has explained, as soon as a failure in network I occurs, the winding 5 ceases to be energized and the switch 6 is coupled via contact 16 so that the inverter 9 continues to be controlled and furnishes an AC of the same frequency and phase while being itself supplied DC from the battery 12. Simultaneously, the switches 20 and 26 are closed and as a result, the turbine 21 is started up by the generator 18 functioning temporarily as a motor, itself being supplied by the battery 12.

As soon as the turbine resumes functioning, the generator 18 furnishes DC current to supply the inverter 9. When the current is reestablished in network I, the energization of winding 5 causes the switch arm 6 to drop and opens the switches 20 and 26 so as to reestablish the direct supply of power by the supply network.

It is evident that the synchronizing circuit 1 can be constituted in ways other than the one indicated schematically above the foregoing. Actually, this circuit 1 can be constituted by an electronic oscillator of which there exist numerous types known in the art which can be substituted for the one described without resulting in any modification of the object of the invention. In FIG. 2 there is represented a variation of the invention which permits obtaining the same result, namely furnishing current to the load circuit II without modification of frequency or phase and without interruption whenever a failure occurs in network I.

According to this variation, there is provided on the line 2 a rectifier assembly 28 of any appropriate type that serves to energize the inverter assembly 9 which can be the same as the one described with reference to a FIG. 1. In this case, the inverter assembly 9 works continuously and has a charge which depends upon the power consumption of the load circuit II.

As in the preceding case, the system includes a battery 12 held under charge by a charging circuit 13 energized by the line 14. The battery 12 is also linked by lead 29 to portion 2a of the circuit 2, that is to say ahead of the commutation assembly 9 and a generator set 17, similar to the one FIG. 1, is provided in order to furnish the current when a failure occurs in the network I. This failure is sensed by a relay 30 energized by the network I and whose closing, in case of failure of the said network, has the effect of coupling the batter 12, by a lead 31, to the supply terminal 32 which assures the furnishing of DC to the solenoid relay 27 of the generator 18 and to the auxiliary means assuring the functioning of the turbine 21.

When the failure of the network ceases, the energization of the relay 30 reestablishes the system in its original state. If desired, relay 30 can be a time delay relay arranged so that the beginning of the functioning of the generator combine 17 is not immediate thereby permitting failures of short duration, for example, on the order of about several second, to be cured. These are the most frequent types of failures. At the same time, only the current furnished by the battery 12 is used, the battery thereupon being recharged by its charger 13.

In the two embodiments of the overall system described above, the charger set 17 can consist of other known means capable of fulfilling the same function. In particular, it is clear to anyone skilled in the art that the gas turbine 21 can be replaced by a diesel motor or a steam engine, a solar motor, a fuel cell or even a thermoelectric generator, the choice depending only on the needs and on the particular application in which the system is to be utilized.

In certain installations, the load circuits can be of different types, some such as II permitting no interruption of their supply while others such as circuit IIa (see FIG. 3) can tolerate without appreciable annoyance an interruption of current for several seconds or even several minutes. Such is the case with circuits which include as a load, heating, air-conditioning, or lighting installations which are nonessential loads.

In such a case, as shown in FIG. 3, the system includes as in FIG. 2a, a rectifier assembly 28, fed by network I, which feeds the commutation subassembly 9. The latter can also be supplied by battery 12 held in a state of appropriate charge by charger 13.

The current generator subassembly includes, in this case, on one hand the generator 18 driven by its gas turbine 21 and on the other hand, an alternator 33 linked by a supply lead 34 directly to the terminals of the circuit IIa which can tolerate an interruption of the current. This form of the invention allows the use of a rectifier subassembly 28, the commutation subassembly 9 and the battery 12 with dimensions smaller than those which would be necessary if the two load circuits II and IIa had to be directly supplied by these means.

The invention is not limited to the examples and embodiments represented and described in detail, for various modifications can be introduced therein without departing from its essence. In particular, in the case where the overall system is constructed as in FIG. 2, it is possible that the commutator subassembly may not function at the same frequency as the supply network, since the load circuit is always supplied by the said commutation subassembly no matter what the state of the network. Moreover, if the charging subassembly is a fuel cell, it is possible to dispose this charging subassembly in place of conventional battery 12 which is then dispensed with.

I claim:

1. In a system for supplying AC power in which there is a normal AC source and a load normally supplied by said source the combination comprising:
   a. means coupled to said load for changing DC input thereto to AC output,
   b. first means for producing DC and supplying it to the input of said (a) means at all times,
   c. second means coupled to said (a) means and being responsive to a failure in said normal AC source for producing DC and supplying it only to the input of said (a) means only in the event of such failure,
   d. means coupled to said normal AC source for maintaining said (b) means energized while said normal source is functioning normally, and
   e. means including resonating electromechanical means for maintaining the output of said (a) means in frequency and phase synchronization with the AC from said normal source despite short or long-term failures therein.

2. The system according to claim 1 wherein said (e) means includes means which naturally resonates at the frequency of the AC from said normal source and in phase therewith, said resonating means being normally coupled to and energized by said source and also being coupled to the input of said (a) means for controlling the frequency and phase of the output of the latter, said additional (e) means also including means coupled to the output of said (a) means which enables said resonating means to synchronize said (a) means in frequency and phase only when a failure in said normal source occurs.

3. The system according to claim 1 wherein said (a) means is a synchronizable inverter, said (b) means is a battery, said (c) means includes a self-powered DC generator and also includes means for activating it only in the event of a failure in said source, said (d) means includes a charger coupled between said source and said battery, and wherein said (e) means includes electromechanical magnetic means coupled to said source and to said (a) means to synchronize the latter.

4. In a system for supplying AC power in which there is a normal AC source and a load normally supplied by said source the combination comprising:
   a. inverter means whose output is coupled to said load and substantially solely supplies AC current to said load when said normal AC source is operating,
   b. a battery which supplies DC to the input of said inverter at all times,
   c. a self-powered DC generator whose output is coupled to the input of said inverter,
   d. rectifier means coupled between said AC source and the input of said inverter means, said rectifier means applying DC to the input of said inverter when said source is functioning normally, and
   e. means responsive to a failure in said source for activating said DC generator.

5. The system according to claim 4 with the addition of means for charging said battery at least when said source is functioning normally.

6. The system according to claim 1 wherein said (e) means comprises an inductive load coil connected to the input of said (a) means, a magnetic vibrating means in a magnetic circuit with said inductive load coil for inducing voltages therein when said vibrating means is vibrating, a first excitation winding connected to said normal AC source for exciting said vibrating member when said source is functioning, a second excitation winding adapted to be connected to the output of said (a) means only when power from said AC source fails, said second winding maintaining said vibrating means in vibrating condition in response to the output of said (a) means.

7. The system according to claim 6 wherein there is a switch connected between one terminal of said normal AC source and a corresponding terminal of said load circuit, said switch normally being operative to connect said one input terminal with said corresponding output terminal when said normal AC source is functioning, and wherein said switch is adapted to connect said second excitation winding to said corresponding output terminal in response to the deenergization of said first excitation winding when said AC power source fails.

8. The system according to claim 1 wherein said normal AC source operates at a first predetermined frequency and said inverter means operates at a second predetermined frequency which is different from said first frequency.

9. The system according to claim 1 with the addition of a motor and at least one pump driven by said motor coupled to said (c) means.

10. The system according to claim 3 wherein said (e) means comprises an inductive load coil connected to the input of said (a) means, a magnetic vibrating means in a magnetic circuit with said inductive load coil for inducing voltages therein when said vibrating means is vibrating, a first excitation winding connected to said normal AC source for exciting said vibrating member when said source is functioning, a second excitation winding adapted to be connected to the output of said (a) means only when power from said AC source fails, said second winding maintaining said vibrating means in vibrating condition in response to the output of said (a) means.

11. The system according to claim 10 wherein there is a switch connected between one terminal of said normal AC source and a corresponding terminal of said load circuit, said switch normally being operative to connect said one input terminal with said corresponding output terminal when said normal AC source is functioning, and wherein said switch is adapted to connect said second excitation winding to said corresponding output terminal in response to the deenergization of said first excitation winding when said AC power source fails.